Feb. 20, 1945. R. T. WHITNEY 2,369,994
BRAKE RELEASING APPARATUS
Filed July 1, 1943
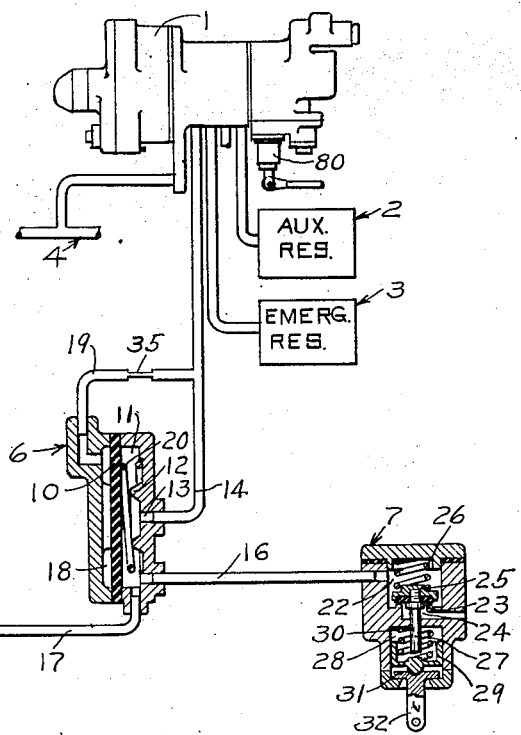
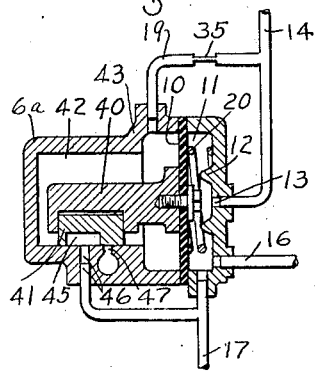
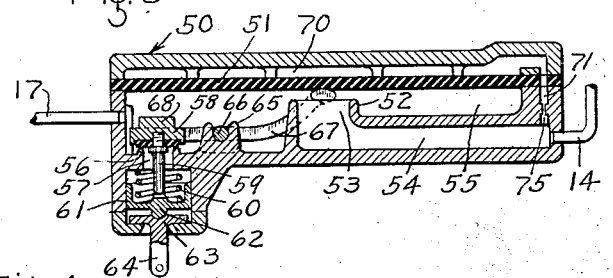
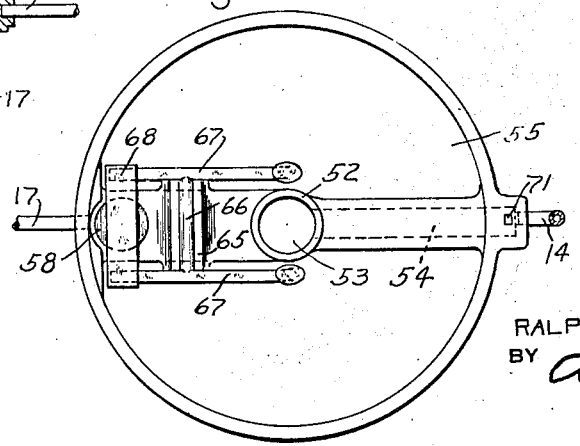
INVENTOR
RALPH T. WHITNEY
BY
ATTORNEY Patented Feb. 20, 1945

2,369,994

UNITED STATES PATENT OFFICE 2,369,994

BRAKE RELEASING APPARATUS

Ralph T. Whitney, Irwin, Pa., assignor to The Westinghouse Air Brake Company, Wilmerding, Pa., a corporation of Pennsylvania Application July 1, 1943, Serial No. 493,016

14 Claims. (Cl. 303—68)

This invention relates to fluid pressure brake apparatus of the automatic type and more particularly to means for causing operation of said apparatus to effect a release of the brakes.

When a car equipped with automatic fluid pressure brake apparatus and having the reservoir or reservoirs thereof charged with fluid under pressure is cut out of a train and the brake pipe on the car is vented the brake controlling valve device will, as a result of such venting, move to emergency position. Movement of the brake controlling valve device to emergency position establishes communication between the reservoir or reservoirs and the brake cylinder device and permits the fluid in said reservoir or reservoirs to equalize into the brake cylinder device to effect an emergency application of the brakes on the car.

When releasing a brake application thus effected, the heretofore practice has been for a trainman to operate the reservoir release valve or valves to completely dissipate the fluid pressure from the reservoir or reservoirs and thereby from the connected brake cylinder device. This operation not only wastes the stored fluid pressure in the reservoir but also requires time on the part of the trainman, since he must hold the reservoir release valve or valves open until the brakes are released. When the car is subsequently placed in a train, it is then necessary to completely recharge the reservoir or reservoirs, either by a local yard charging plant or by a coupled locomotive, before the train may be moved. This requires a relatively long period of time and consequently excessive use and wear of apparatus to accomplish same, all of which is undesirable.

From the foregoing it will be understood that it is undesirable to dissipate the stored fluid pressure in the reservoir or reservoirs to effect a release of the brakes when the car is cut out of a train and the principal object of the invention is to provide novel brake releasing means which will overcome this objectional feature.

Other objects and advantages will be apparent from the following more detailed description of the invention.

In the accompanying drawing Fig. 1 is a diagrammatic view partly in section of an "AB" brake equipment having associated therewith brake release means embodying the invention; Fig. 2 is a fragmentary view showing a modified form of the invention. Fig. 3 is a fragmentary view showing still another form of the invention and Fig. 4 is a plan view of the device shown in Fig. 3, the cap and diaphragm of the device being removed.

Description Fig. 1

As shown in Fig. 1 of the drawing the brake equipment comprises a brake controlling valve device 1, an auxiliary reservoir 2, an emergency reservoir 3, a brake pipe 4, a brake cylinder 5, a cut off valve device 6 and a pressure release valve device 7.

The brake controlling valve device 1 shown is of the "AB" type. This controlling valve device may be of substantially the same construction as the "AB" valve device fully described in the patent to Clyde C. Farmer, No. 2,031,213, issued February 18, 1936, and in view of this it is deemed unnecessary to show and describe the device in detail. It will of course be understood that this mechanism operates upon a service reduction in brake pipe pressure to supply fluid under pressure from the auxiliary reservoir to the brake cylinder to effect a service application of the brakes, upon an emergency reduction in brake pipe pressure to supply fluid under pressure from both the auxiliary and the emergency reservoirs to the brake cylinder to effect an emergency application of the brakes and upon an increase in brake pipe pressure to effect a release of the brakes and the charging of the brake equipment.

The cut-off valve device 6 may comprise a two piece casing having clamped therebetween in any suitable manner, a flexible diaphragm 10. At one side of this diaphragm there is a valve chamber 11 having contained therein a seat rib 12 which surrounds a passage 13. The passage 13 is connected to a pipe 14 leading to the usual "AB" brake cylinder connection. The valve chamber 11 is connected outside the seat rib 12 to the pressure release valve device 7 by means of a pipe 16 and to the brake cylinder device 5 by means of a pipe 17. At the opposite side of the diaphragm 10 there is a control chamber 18 which is connected to pipe 14 through a pipe 19.

Contained in valve chamber 11 and surrounding the seat rib 12 is a spring 20 which, at all times, tends to urge the diaphragm 10 to the position in which it is shown, i. e., out of engagement with the seat rib.

The pressure release valve device 7 may comprise a casing having a chamber 22 which is in constant open communication with the pipe 16. The lower wall of the chamber is provided with an annular valve seat 23 surrounding a passage 24 leading to the atmosphere. Contained in chamber 22 is a valve 25 yieldably urged into engagement with valve seat 23 by means of a spring 26.

The valve 25 is provided with a stem 27 which extends into a chamber 28 in which there is slidably mounted a plunger 29 which is urged downwardly out of engagement with the end of the stem 27 by means of a spring 30. Beneath the plunger 29 is a rocking element 31 having an operating arm 32 which extends to the exterior of the casing and which when rocked forces the plunger upwardly first into engagement with the end of the stem 27 and then, through the medium of the stem, forces the valve 25 upwardly out of engagement with the seat 23.

Operation

Assume that the brake equipment is fully charged with fluid under pressure and that the brake controlling valve device 1 is in its release position. Under these conditions the pipe 14 and consequently the connected chambers 11 and 18 at opposite sides of the diaphragm 10 are vented through the usual brake cylinder exhaust passage in the brake controlling valve device 1. With the chambers 11 and 18 at atmospheric pressure the spring 20 acts to maintain the diaphragm 10 in the position shown so that the valve chamber 11 and connected chamber 22 in the pressure release valve device 7 and the brake cylinder 5 are also connected to the pipe 14 and thereby vented through the brake controlling valve device.

When it is desired to effect either a service or an emergency application of the brakes the brake pipe pressure is reduced thus causing the brake controlling valve device 1 to function in the usual well known manner to supply fluid under pressure to the pipe 14. From pipe 14 fluid under pressure flows to chambers 11 and 18 in the cut off valve device 6. The flow of fluid under pressure from pipe 14 to valve chamber 11 is by way of passage 13 and the flow of fluid under pressure from pipe 14 to control chamber 18 is by way of pipe 19 through a restriction or choke 35. It will be understood that since flow of fluid under pressure from the brake controlling valve device 1 is supplied to both sides of the diaphragm 10 the spring 20 acts to maintain the diaphragm in the position shown.

Fluid under pressure thus supplied to valve chamber 11 flows therefrom by way of pipe 17 to the brake cylinder 5 to effect an application of the brakes in the usual manner and also flows to chamber 22 in the pressure release valve device 7. Since the pipe 16 leading from the valve chamber 11 to the release valve device 7 may be short and the volume of the chamber 22 in the release valve device 7 small, no material change in the pressure of fluid developed in the brake cylinder 5 over that developed in the equipment not embodying the present invention, will result.

When it is desired to effect a release of the brakes following either a service or an emergency application of the brakes the brake pipe pressure is increased, thereby causing the brake controlling valve device 1 to function in the usual manner to release fluid under pressure from the pipe 14. As a result of a reduction in pressure in the pipe 14, pressure in the connected chambers 11 and 18 in the cut off valve device 6 is released the spring 20 maintains the diaphragm positioned as shown and consequently the fluid under pressure in the brake cylinder 5 is reduced by way of pipe 17 valve chamber 11, past seat rib 12 and pipe 14 thus effecting a release of the brakes.

It should here be mentioned that the flow area of the choke 35 is such that it will not permit the pressure of fluid in chamber 18 to increase at a faster rate than the brake cylinder pressure is increasing in chamber 11 when an application of the brakes is being effected, and will permit the reduction in the pressure of fluid in chamber 11 at a rate fast enough to prevent the flexing of the diaphragm 10 toward its seat 12.

From the foregoing it will be understood that the brakes on the vehicle may be applied and released in the usual manner without any interference from the cut off valve device 6.

If a car provided with the equipment shown and described in Fig. 1 is cut out of a train and the brake pipe 4 is vented, the brake controlling valve device 1 will operate to cause an emergency application of the brakes in the same manner as above described, it being understood that when an emergency application of the brakes is effected fluid under pressure is supplied to the brake cylinder 5 from both the auxiliary and emergency reservoirs 2 and 3, respectively.

With the brakes on the car thus applied in emergency the brake pipe 4 will be at atmospheric pressure. Now, let it be assumed that it is desired to release the fluid under pressure from the brake cylinder 5 for releasing the car brakes, without recharging the brake pipe 4 and without losing the stored fluid under pressure in the auxiliary and emergency reservoirs 2 and 3, respectively.

To accomplish this the brakeman rocks the operating arm 32 of the pressure release valve device 7, thus causing the plunger 29 to move upwardly against the opposing pressure of spring 30 into engagement with the end of the valve stem 27. Continued rocking movement of the arm 32 caused the plunger 29 to move the valve 25, upwardly against the opposing pressure of spring 26, out of engagement with its seat 23, thus connecting chamber 22 to the atmospheric passage 24. With this communication established the pressure of fluid in valve chamber 11 of the cut off valve is quickly vented to the atmosphere by way of pipe 16, chamber 22 in the pressure release valve device 7, past unseated valve 25 and passage 24.

It should here be noted that the flow of fluid under pressure from valve chamber 11 through the circuit just traced is at a relatively unrestricted rate and much faster than the pressure of fluid in control chamber 18 at the opposite side of the diaphragm 10 can be reduced due to the choke 35 in pipe 19. As a result, the higher pressure of fluid acting in control chamber 18 overcomes the opposing pressure of the spring 20 and causes the diaphragm 10 to deflect in a direction toward the right hand until brought to a stop by engagement with the annular rib 12. When this occurs the portion of the valve chamber 11 within the rib 12 is cut off from the rest of the chamber 11 so that the pressure of fluid supplied to pipe 14 and control chamber 18 and acting over the entire area of diaphragm 10 causes the diaphragm to be maintained in engagement with the seat rib 12. Since the brake cylinder 5 is connected by way of pipe 17 to the valve chamber 11 outside the seat rib 12 and since this portion of the valve chamber 11 is connected to the atmosphere in the manner just described it will be apparent that fluid under pressure in the brake cylinder 5 will be vented to the atmosphere to effect a release of the brakes.

It follows that the brake cylinder 5 is vented to the atmosphere by way of the valve device 7 and that the pipe 14, normally establishing communication between the brake controlling valve device and thereby the auxiliary and emergency reservoirs and the brake cylinder, is blanked, thus providing for a release of the brake without losing the stored fluid pressure in said reservoirs.

When the pressure of fluid in the brake cylinder 5 is released and the brakes on the vehicle released, the trainman relieves the pressure on arm 32 of the pressure release valve device 7, and as a result the springs 30 and 26 therein act to return the plunger 27 and valve 25 to the position in which they are shown.

Now, when the car is cut into a train and the pressure in the brake pipe 4 has been increased to a degree sufficient to cause the brake controlling valve device 1 to move to its release position, the pipe 14 and consequently the control chamber 18 of the cut off valve device 6 is vented by way of the service portion of the valve device 1. When the pressure of fluid in this control chamber and acting on the diaphragm 10 is thus reduced to a degree slightly below the opposing pressure of spring 20, the spring acts to move the diaphragm 10 out of engagement with the seat rib 12 to the position in which it is shown in Fig. 1 of the drawing, thus reestablishing communication between the controlling valve device 1 and the brake cylinder 5.

Description Fig. 2

In the embodiment of the invention shown in Fig. 1 and just described, the trainman must manually maintain the valve 25 of the pressure release valve device 7 unseated until the fluid under pressure is released from the brake cylinder. In order to avoid having to hold the release valve manually open until the brake cylinder pressure is depleted of fluid under pressure, a valve device 6a such as shown in Fig. 2 may be employed. This device differs from the device 6 shown in Fig. 1 in that the diaphragm 10 has attached thereto a diaphragm follower or stem 40 arranged to actuate a slide valve 41 which is contained in a control chamber 42 provided for in a new casing section 43 substituted for the casing section shown at the left hand side of the diaphragm 10 in Fig. 1.

When an application of the brakes is effected with this arrangement the control valve chambers 42 and 11 are charged with fluid under pressure, supplied from the pipe 14 and the spring 20 maintains the diaphragm 10 and thereby the slide valve 41 in the position in which it is shown, so that during normal operation of the brake controlling valve device 1 fluid under pressure is supplied to and released from the brake cylinder in the same manner as hereinbefore described in connection with the embodiment shown in Fig. 1.

When the valve chamber 11 is vented to the atmosphere by operation of the pressure release valve device 7 the higher pressure in control chamber 42 will cause the diaphragm 10 to move into engagement with the seat rib 12 thus blanking the communication from pipe 14 to the brake cylinder pipe 17 in the same manner as previously described in connection with the apparatus of Fig. 1. With the diaphragm 10 engaging the seat rib 12, the slide valve 41 will have moved to a position in which a cavity 45 therein connects a passage and pipe 46 with a passage 47 leading to the atmosphere, the passage and pipe 46 being connected to the pipe 17 leading to the brake cylinder device 5. With the slide valve 41 thus positioned, fluid under pressure flows from the brake cylinder 5 to the atmosphere by way of pipe 17, pipe and passage 46, cavity 45 in the slide valve 41 and passage 47. Since the pipe 17 is connected to the atmosphere through the circuit just traced it will be apparent that connected valve chamber 11 outside of the seat rib 12 is also connected to the atmosphere so that the trainman may permit the valve 25 in the pressure release valve 7 to seat without causing the valve device 6a to operate to cut off the flow of fluid under pressure from the brake cylinder to the atmosphere. It of course will be understood that the pressure of fluid in control chamber 42 will maintain the diaphragm 10 and connected slide valve 41 in the brake cylinder venting position until the brake controlling valve device 1 is again operated to its release position to vent fluid under pressure from the pipe 14 and consequently from the chamber 42. When chamber 42 is vented, the spring 12 will act to return the diaphragm 10 to the position in which it is shown.

Description Figs. 3 and 4

If desired, a combined cut-off and release valve device 50 such as shown in Figs. 3 and 4 may be employed in place of the cut-off valve device shown in Fig. 2 or of the pressure release valve device 7 shown in Fig. 1 to accomplish the same results.

The combined cut-off and release valve device 50 may comprise a two piece casing having clamped therebetween a diaphragm 51. At one side of the diaphragm there is an annular seat rib 52 arranged for sealing engagement by the diaphragm. Within this seat rib is a chamber 53 to which a passage 54 is connected, the passage 54 in turn being connected to the pipe 14 leading to the brake controlling valve device 1. Encircling the seat rib 50 is an annular valve chamber 55 which is in constant open communication with the pipe 17 leading to the brake cylinder 5. The lower wall of the valve chamber 55 is provided with an annular valve seat 56 surrounding a passage 57 leading to the atmosphere. Mounted in valve chamber 55 is a valve 58 having a stem 59, which valve is yieldably urged into engagement with the valve seat 56 by means of a spring 60 which is interposed between the casing and a spring seat 61 carried by the valve stem 59.

The valve stem 59 is provided with an extension 62 which engages a rocking element 63 having an operating arm 64 which extends to the exterior of the casing and which, when rocked, acts to unseat the valve 58 against the opposing pressure of the spring 60.

Disposed in valve chamber 55 and preferably formed integral with the casing is a lug 65 which is grooved to carry a pin 66. Secured to the pin 66 is a pair of spaced levers 67. One end of each lever is connected to the valve 58 by means of a member 68 which may be secured to or formed integral with the valve. With the valve positioned as shown, i. e., in engagement with its seat, the opposite end of each lever engages the lower side of the diaphragm 10, at opposite sides of the seat rib 52. As hereinbefore mentioned the spring 60 acts to normally maintain the valve 58 seated and also acts through the medium of member 68 and levers 67 to normally maintain the diaphragm 51 out of engagement with the seat rib 52 as shown in the drawing.

At the opposite side of the diaphragm 57 there is a control chamber 70 of small capacity which is connected to passage 54 by way of a passage 71.

When an application of the brakes is effected on a car employing this device, fluid under pressure supplied to pipe 14 flows therefrom to valve and control chambers 55 and 70, respectively. The flow of fluid under pressure from pipe 14 to control chamber 70 is by way of passages 54 and 71, and to valve chamber 55 is by way of passage 54, chamber 53, and past the seat rib 52. It will be understood that so long as the valve 58 is maintained seated, the spring 60 will act through the medium of the valve and connected levers 67 to maintain the diaphragm in the position shown. Since the diaphragm 51 is normally maintained in this position it will be apparent that fluid under pressure will be supplied to and released from the brake cylinder by way of a circuit including pipe 17, chamber 55, past seat rib 52, chamber 53, passage 54 and pipe 14.

Now when a car employing this device is cut out of a train and it is desired to release the brakes, without recharging the brake pipe, and without losing the stored fluid under pressure in the auxiliary and emergency reservoirs, the trainman will rock the operating arm 64 to effect upward movement of the valve 58 against the opposing pressure of spring 60. As the valve moves upwardly it moves out of engagement with its seat 56 and carries the ends of the levers 67 attached thereto upwardly with it thereby causing the levers and pin 66 to rock in a clockwise direction so that the opposite ends of the levers are moved out of engagement with the diaphragm 51.

Upon movement of the valve 58 out of engagement with its seat 56 fluid under pressure flows from valve chamber 55 and the connected brake cylinder 5 to the atmosphere at a rapid rate past unseated valve 58 and passage 57. It will be noted that the flow of fluid under pressure from the chamber 70 at the opposite side of the diaphragm will be by way of restriction 75 in the passage 71 at a slow rate so that the pressure in this chamber will be higher than that in chamber 54. Fluid at this higher pressure in control chamber 70 causes the diaphragm 51 to deflect downwardly into sealing engagement with the seat rib 52 and also into engagement with the right hand end of the levers 67.

With the diaphragm 51 in sealing engagement with the seat rib 52, communication between chambers 53 and 55 is cut off thereby blanking the communication between the brake controlling valve device and the brake cylinder. Since the auxiliary and emergency reservoirs are open through the brake controlling valve device to this communication the stored fluid in said reservoirs will be retained. It will be understood that since the brake cylinder control pressure in control chamber 70 acts over the entire area of the diaphragm 51 it will maintain the diaphragm in sealing engagement with the seat rib 52 against the opposing brake cylinder control pressure acting in chamber 53.

As hereinbefore mentioned the diaphragm engages the right hand end of the levers 67 when deflected into engagement with the seat rib 52, so that said levers act at this time to maintain the valve unseated. Since the levers 67 act to maintain the valve 58 unseated it will be apparent that a trainman may upon opening the valve attend to other duties without waiting for a complete release of fluid under pressure from the brake cylinder.

When the car is again cut into a train and the pressure of fluid in pipe 14 is vented by operation of the control valve device, in the usual manner, the pressure of fluid in connected control chamber 70 will also be vented. Upon venting of fluid under pressure from the control chamber 70, the diaphragm 51 moves to its normal position and the spring 60 will act through the medium of spring seat 60 and stem 59 to move the valve downwardly into engagement with its seat 56. This downward movement of the valve causes the attached levers 67 to rock in a counterclockwise direction about the pin 66 into the position in which they are shown in the drawing so that the device is automatically moved to its normal position.

It will be noted that the usual "AB" reservoir release valve device is shown in Fig. 1 of the drawing and is identified by the reference numeral 80. This device may be operated to deplete the brake cylinder, auxiliary reservoir and emergency reservoir of fluid under pressure when this is desired. The only time that this is desirable is when the reservoirs or some connection in open communication therewith is to be removed or replaced. Normally the trainman will make use of the valve device 7 to effect the release of the brakes and thereby maintain the reservoirs partially charged. In some instances the valve device 80 may be rendered inoperative or may be removed. If it is removed the passages leading thereto from the auxiliary reservoir and emergency reservoir may be closed by means of plugs.

Having now described my invention, what I claim as new and desire to secure by Letters Patent is:

1. In a brake cylinder release valve mechanism for interposition between the brake cylinder connection of the brake controlling valve device and the brake cylinder of a fluid pressure brake equipment, said mechanism comprising in combination, a valve subject to the opposing pressures of fluid in a control chamber and a valve chamber and normally establishing communication between the brake cylinder connection and the brake cylinder by way of the valve chamber and operative upon a reduction in the pressure of fluid in the valve chamber for cutting off the communication between the brake cylinder connection and the brake cylinder, a passage through which fluid under pressure may be vented from the valve chamber and the brake cylinder to effect a reduction in the pressure of fluid in the valve chamber and the brake cylinder, and means having a normal position for closing said passage and operative to another position for opening said passage.

2. In a brake cylinder release valve mechanism for interposition between the brake cylinder connection of the brake controlling valve device and the brake cylinder of a fluid pressure brake equipment, said mechanism comprising in combination, a valve chamber, a control chamber, a valve subject to the opposing pressures of fluid in said chambers, said valve having a normal position for establishing communication between the brake cylinder connection and the brake cylinder by way of said valve chamber and operative to another position upon a reduction in the pressure of fluid in said valve chamber for cutting off the communication between the brake cylinder connection and the brake cylinder, and means operative to effect a reduction in the pressure of fluid in said valve chamber and brake cylinder.

3. In a brake cylinder release valve mechanism for interposition between the brake cylinder connection of the brake controlling valve device and the brake cylinder of a fluid pressure brake equipment, said mechanism comprising in combination, a valve chamber, a control chamber, an always open communication between said chambers, a valve subject on one face to the pressure of fluid in said valve chamber and on its opposite face to the pressure of fluid in said control chamber, said valve having a normal position for establishing communication between the brake cylinder connection and the brake cylinder and operative to another position in response to a pressure differential acting on said valve for cutting off the communication between the brake cylinder connection and the brake cylinder, and means for creating said pressure differential, said means including valve means operative to reduce the pressure of fluid in said valve chamber and to at the same time effect a release of fluid under pressure from said brake cylinder.

4. In a brake cylinder release valve mechanism for interposition between the brake cylinder connection of the brake controlling valve device and the brake cylinder of a fluid pressure brake equipment, said mechanism comprising in combination, a valve chamber, a control chamber, an always open communication between said chambers, a valve subject on one face to the pressure of fluid in said valve chamber and on its opposite face to the pressure of fluid in said control chamber, said valve having a normal position for establishing communication between the brake cylinder connection and the brake cylinder and operative to another position in response to a pressure differential acting on said valve for cutting off the communication between the brake cylinder connection and the brake cylinder, and means for creating said pressure differential, said means including valve means operative to reduce the pressure of fluid in said valve chamber and to at the same time effect a release of fluid under pressure from said brake cylinder, and means for restricting the flow of fluid under pressure through said always open communication.

5. In a brake cylinder release valve mechanism for interposition between the brake cylinder connection of the brake controlling valve device and the brake cylinder of a fluid pressure brake equipment, said mechanism comprising in combination, a valve chamber, a control chamber, an always open communication between said chambers, a valve subject on one face to the pressure of fluid in said valve chamber and on its opposite face to the pressure of fluid in said control chamber, said valve having a normal position for establishing communication between the brake cylinder connection and the brake cylinder and operative to another position in response to a pressure differential acting on said valve for cutting off the communication between the brake cylinder connection and the brake cylinder, a passage through which fluid under pressure may be vented from the valve chamber and the brake cylinder, valve means for normally closing said passage and operative to open said passage, and means interposed in said always open communication for creating said pressure differential upon operation of said valve means to open said passage.

6. In a brake cylinder release valve mechanism for interposition between the brake cylinder connection of the brake controlling valve device and the brake cylinder of a fluid pressure brake equipment, said mechanism comprising in combination, a valve chamber, a control chamber, a movable abutment subject to the opposing pressures of fluid in said chambers, said abutment having a normal position for establishing communication between the brake cylinder connection and the brake cylinder and operative to another position upon a reduction in the pressure of fluid in said valve chamber for cutting off the communication between the brake cylinder connection and the brake cylinder, a passage through which fluid under pressure may be vented from the valve chamber and the brake cylinder, a valve having a normal position for closing said passage and another position for opening said passage, yielding means for normally maintaining said valve in said normal position, manually operative means for effecting movement of said valve to said other position, and means for maintaining said valve in said other position so long as said movable abutment remains in its other position.

7. In a brake cylinder release valve mechanism for interposition between the brake cylinder connection of the brake controlling valve device and the brake cylinder of a fluid pressure brake equipment, said mechanism comprising in combination, a valve chamber, a control chamber, a movable abutment subject to the opposing pressures of fluid in said chambers, said abutment having a normal position for establishing communication between the brake cylinder connection and the brake cylinder and operative to another position upon a reduction in the pressure of fluid in said valve chamber for cutting off the communication between the brake cylinder connection and the brake cylinder, a passage through which fluid under pressure may be vented from the valve chamber and the brake cylinder, a valve having a normal position for closing said passage and operative to another position for opening said passage, manually operative means operative to effect operation of said valve to said other position, and means operative by operation of said movable abutment to said other position for maintaining said valve in its said other position so long as said movable abutment is maintained in said other position.

8. In a brake cylinder release valve mechanism for interposition between the brake cylinder connection of the brake controlling valve device and the brake cylinder of a fluid pressure brake equipment, said mechanism comprising in combination, a valve seat, a valve having one position in which it engages said valve seat and a normal position in which it is out of engagement with said valve seat, said valve being of larger diameter than said valve seat, a passage surrounded by said valve seat, said passage being connected to the brake cylinder connection of the brake controlling valve device, a chamber connected to the brake cylinder and encircling said valve seat, said chamber being open to said passage when said valve is in said normal position, said valve being responsive to a reduction in pressure in said chamber to move from its normal position to its other position to isolate said passage from said chamber, a passage through which fluid under pressure may be vented from said chamber and thereby said brake cylinder, and means normally closing said passage and being manually operative to open said passage.

9. In a release valve mechanism for interposition between the brake cylinder connection of the brake controlling valve device and the brake cylinder of a fluid pressure brake equipment, said mechanism comprising in combination, a valve seat, a valve normally maintained out of engagement with said valve seat, said valve being of larger diameter than said valve seat, a passage surrounded by said valve seat, said passage being connected to the brake cylinder connection of the brake controlling valve device, a chamber encircling said valve seat and in constant open communication with the brake cylinder, said valve being responsive to a reduction in pressure in said chamber to move into engagement with said valve seat to isolate said passage from said chamber, and means operative to vent fluid under pressure from said chamber and thereby said brake cylinder.

10. In a release valve mechanism for interposition between the brake cylinder connection of the brake controlling valve device and the brake cylinder of a fluid pressure brake equipment, said mechanism comprising in combination, a valve seat, a valve normally maintained out of engagement with said valve seat, said valve being of larger diameter than said valve seat, a passage surrounded by said valve seat, said passage being connected to the brake cylinder connection of the brake controlling valve device, a chamber encircling said valve seat and in constant open communication with the brake cylinder, said valve being responsive to a reduction in pressure in said chamber to move into engagement with said valve seat to isolate said passage from said chamber, a communication through which fluid under pressure may be vented from said chamber and thereby said brake cylinder, means having a normal position for closing said communication and operative to another position for opening said communication, and lever means for maintaining said means in said other position so long as said valve is maintained in engagement with said valve seat.

11. In a release valve mechanism for interposition between the brake cylinder connection of the brake controlling valve device and the brake cylinder of a fluid pressure brake equipment, said mechanism comprising in combination, a valve seat, a valve normally maintained out of engagement with said valve seat, said valve being of larger diameter than said valve seat, a passage surrounded by said valve seat, said passage being connected to the brake cylinder connection of the brake controlling valve device, a chamber encircling said valve seat, said chamber being open to said passage when said valve is in said normal position and isolated from said passage when said valve is in said other position, said valve being responsive to a reduction in pressure in said valve chamber to move from its normal position to its other position, means establishing a passage through which fluid under pressure is vented from the brake cylinder upon operation of said valve to said other position, and means manually operative to effect a reduction in pressure in said chamber.

12. In a brake cylinder release valve mechanism for interposition between the brake cylinder connection of the brake controlling valve device and the brake cylinder of a fluid pressure brake equipment, said mechanism comprising in combination, a valve seat, a valve having one position in which it engages said valve seat and a normal position in which it is out of engagement with said valve seat, said valve being of larger diameter than said valve seat, a passage surrounded by said valve seat, said passage being connected to the brake cylinder connection of the brake controlling valve device, a valve chamber, a control chamber, a valve subject to the opposing pressures of fluid in said chambers, said valve having a normal position for establishing communication between the brake cylinder connection and the brake cylinder by way of said valve chamber and operative to another position upon a reduction in the pressure of fluid in said valve chamber for cutting off the communication between the brake cylinder connection and the brake cylinder, and means conditioned upon operation of said valve to said other position for venting fluid under pressure from the brake cylinder and means manually operative to effect a reduction in pressure of fluid in said chamber.

13. In a brake cylinder release valve mechanism for interposition between the brake cylinder connection of the brake controlling valve device and the brake cylinder of a fluid pressure brake equipment, said mechanism comprising in combination, a valve chamber, a control chamber, a movable abutment subject to the opposing pressures of fluid in said chambers, said abutment having a normal position for establishing communication between the brake cylinder connection and the brake cylinder and operative to another position upon a reduction in the pressure of fluid in said valve chamber for cutting off the communication between the brake cylinder connection and the brake cylinder, a passage through which fluid under pressure may be vented from the valve chamber and the brake cylinder, a valve having a normal position for closing said passage and another position for opening said passage, manually operative means for actuating said valve from said normal position to said other position, means for maintaining said valve in said other position so long as said movable abutment remains in its other position, and means for actuating said valve from said other position to said normal position upon operation of said movable abutment from said other position to said normal position.

14. In a brake cylinder release valve mechanism for interposition between the brake cylinder connection or the brake controlling valve device and the brake cylinder of a fluid pressure brake equipment, said mechanism comprising in combination, a valve chamber, a control chamber, an always open communication between said chambers, a valve subject on one face to the pressure of fluid in said valve chambers, said valve having a normal position for establishing communication between the brake cylinder connection and the brake cylinder and operative to another position upon effecting a differential of pressure in said chambers for cutting off the communication between the brake cylinder connection and the brake cylinder, a passage through which fluid under pressure may be released from said valve chamber, means disposed in said always open communication for restricting the flow of fluid from said control chamber upon release of fluid under pressure from said valve chamber to thereby create a differential of pressures in said chambers, a valve having an open position for opening said passage and a closed position for closing said passage, and means automatically operative to shift said movable abutment from said other position to said normal position upon effecting a release of fluid under pressure from said control chamber following subsequent operation of said valve from said open to said closed position.

RALPH T. WHITNEY.